Feb. 14, 1939.   W. ZAPP   2,147,567
LENS MECHANISM FOR PHOTOGRAPHIC APPARATUS
Filed Dec. 6, 1937
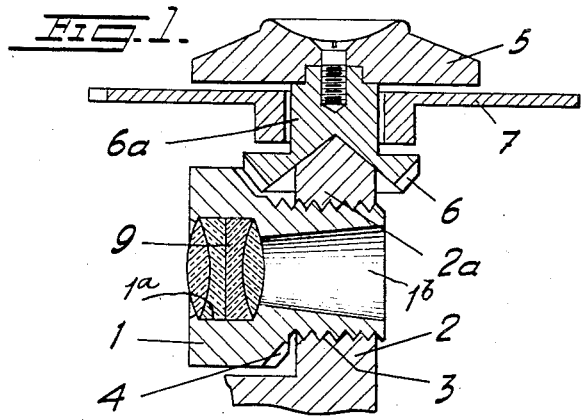
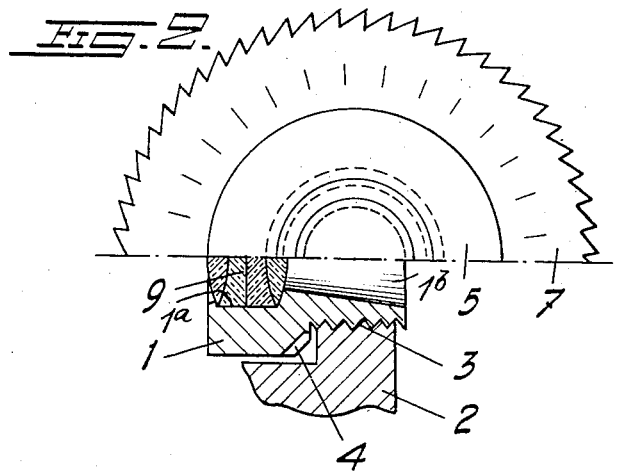
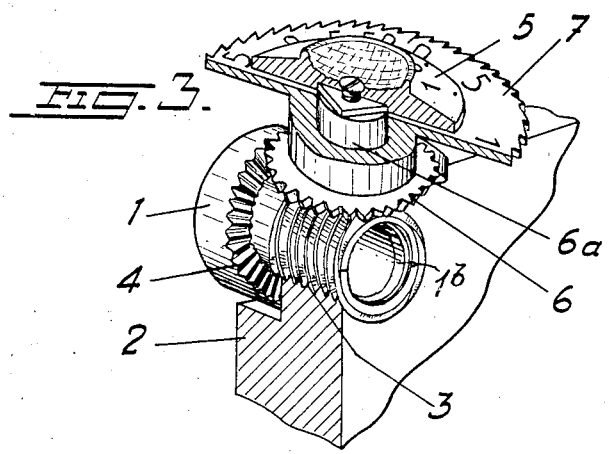
Inventor
Walter Zapp
By Sommers & Young
Att.

Patented Feb. 14, 1939

2,147,567

UNITED STATES PATENT OFFICE 2,147,567

LENS MECHANISM FOR PHOTOGRAPHIC APPARATUS

Walter Zapp, Riga, Latvia, assignor to Valsts Elektrotechniska Fabrika, Riga, Latvia, a company of Latvia Application December 6, 1937, Serial No. 178,391
In Finland December 24, 1936

2 Claims. (Cl. 95—45)

The present invention relates to a distance setting mechanism for lenses in photographic apparatus and more particularly to such setting mechanisms in which an annular member holding the lens or a part thereof is mounted in a part of the casing of the apparatus by means of an external screw thread and is movable in said part of the casing by means of a handle (a disc, a knob or the like) rotatable on an axis perpendicular to the axis of the lens.

The main object of the present invention is to construct setting mechanisms of said type in such manner that the motion of the handle will be transmitted to the lens via a minimum of transmitting members thus reducing the play or back-lash.

Another object is to create a compact construction of said mechanism for using such mechanisms in photographic apparatus of vest pocket size.

Another object of this invention is to create a simple and reliable mechanism for the purpose described.

One embodiment of the invention is shown in the annexed drawing.

Fig. 1 is a vertical section through the mechanism according to the present invention.

Fig. 2 is a plan of the same, partially in horizontal section through the lens, that is a section at right angles to that shown in Fig. 1.

Fig. 3 is a vertical section showing the mechanism perspectively.

The objective or lens 9, which may consist of a single lens or a complex lens system, is mounted in a holder 1 having a lens holding socket 1a, and bore 1b for passage of light from the lens system. This holder has an exterial screw thread 3 engaging a thread in a stationary part 2 of the casing of the photographic apparatus. A bevel gear wheel 4 is formed on the holder 1, the teeth of said wheel being arranged on a helical line having the same axial pitch as that of said screw thread 3. The wheel 4 meshes with a second bevel gear wheel 6 of normal construction which is rotatably mounted upon a journal 2a forming part of the casing 2 and extending in a direction perpendicular to the axis of the lens. The wheel 6 has a central cylindrical stud 6a to which a disc-shaped handle 5 is attached. Upon the stud 6a which is rotatably journalled in the casing 2 of the apparatus a disc 7 for counting the pictures exposed is rotatably mounted.

When the handle 5 is turned this motion is transmitted to the holder 1 and this transmission has substantially no back-lash due to the fact that the parts 5, 6a, 6 are rigidly interconnected and directly engage the holder. This is an advantage especially in view of the fact that the handle 5 cooperates with a graduation for setting the lens for different distances. The helical arrangement of the teeth of the bevel gear wheel 4 ensures a correct engagement of the bevel gears 4, 6 in all positions of the holder, when said holder is screwed inwards or outwards to set the lens or lenses to different distances from the film, in dependence on the distance from the photographic apparatus to the object to be photographed.

The transmitting mechanism described is of a very compact construction but the provision of a stud on the wheel 6 serving as a journal for the disc 7, enables a further reduction of the dimensions of the photographic apparatus, in which said mechanism is arranged.

The mechanism described is especially adapted to be used in combination with the devices described in my co-pending patent applications Serial Nos. 178,389, 178,388 and 178,390, respectively entitled "Improvements in photographic apparatus," "Improvements in film feeding mechanisms for photographic apparatus," and "Improvements in packages for roll film," and filed at the same date as my present application. Some features claimed in said prior applications are also shown and described in the present application.

What I claim is:

1. A setting mechanism for the lens in photographic apparatus, comprising in combination, an annular lens holder, an external screw thread on said holder by means of which it is screwed into the casing of the photographic apparatus, a row of bevel gear teeth arranged on said holder on a helical line, said helical line having the same axial pitch as that of said screw thread, a bevel gear wheel in engagement with said row of teeth and rotatably mounted in said casing, and a handle rigidly attached to said bevel gear wheel for adjusting the lens.

2. A setting mechanism for the lens in photographic apparatus comprising, in combination, an annular lens holder; an external screw thread on said holder by means of which it is screwed into the casing of the photographic apparatus, a row of bevel gear teeth arranged on said holder on a helical line, said helical line having the same axial pitch as that of said screw thread, a bevel gear wheel in engagement with said row of teeth and rotatably mounted in said casing, a cylindrical central stud on said bevel gear wheel, a handle attached to said stud for rotating said gear wheel, and a picture counting disc rotatably mounted on said stud.

WALTER ZAPP.